United States Patent
Ito et al.

[15] 3,701,294
[45] Oct. 31, 1972

[54] HYDRAULIC CONTROL SYSTEM FOR AUTOMATIC TRANSMISSION

[72] Inventors: Shin Ito; Seitoku Kubo; Takakazu Mori, all of Toyota, Japan

[73] Assignee: Toyota Jidosha Kogyo Kabushiki Kaisha, Toyota-shi, Japan

[22] Filed: Dec. 15, 1970

[21] Appl. No.: 98,271

[30] Foreign Application Priority Data

Dec. 16, 1969 Japan....................44/101441

[52] U.S. Cl....................................................74/866
[51] Int. Cl. .............................................B60k 21/00
[58] Field of Search........................................74/866

[56] References Cited

UNITED STATES PATENTS 3,433,101  3/1969  Scholl et al..................74/866
3,435,713  4/1969  Pfisterer et al. ..............74/866
3,448,640  6/1969  Nelson.........................74/866

*Primary Examiner*—C. J. Husar
*Attorney*—Cushman, Darby & Cushman

[57] ABSTRACT

A hydraulic control system for a fluid controlled automatic transmission having means for controlling fluid pressure applied to servo chambers for multiple disc clutch means and brake band means for carrying out an automatic speed change. In the system, the fluid pressure is varied depending on the load on the engine represented by a variable such as the negative pressure in the air intake manifold or the opening of the engine throttle valve.

6 Claims, 17 Drawing Figures

HYDRAULIC CONTROL SYSTEM FOR AUTOMATIC TRANSMISSION

BACKGROUND OF THE INVENTION

1. Field of the Invention

This invention relates to hydraulic control systems for fluid controlled automatic transmissions having means for controlling fluid pressure or line pressure $P_L$ applied to servo chambers for multiple disc clutch means and brake band means for carrying out an automatic speed change, and more particularly to a hydraulic control system of the kind described above in which the fluid pressure is varied depending on the load on the engine represented by a variable such as the negative pressure in the air intake manifold or the opening of the engine throttle valve.

2. Description of the Prior Art

Attempts have been already made to control the pressure of fluid supplied to multiple disc clutch means and brake band means of fluid controlled automatic transmissions for vehicles depending on the running condition of the vehicle so as to effectively carry out an automatic speed change, but these attempts have been unsatisfactory in that accurate control cannot be attained. The present invention intends to simply and accurately carry out the desired control by a unique combination of electrical and hydraulic control means.

The present invention provides improvements over an invention disclosed in a co-pending application Ser. No. 884,476 filed on Dec. 12, 1969 entitled "Hydraulic Control System for Fluid Controlled Automatic Transmission." In the co-pending application, the inventors applied for a patent on a hydraulic control system in which the pressure regulating action of a pressure regulator valve is varied depending on the position of a 1-2 shift valve element so that, when, for example, the speed ratio is changed from the first to second speed due to the operation of the 1-2 shift valve element, the line pressure $P_L$ in the second speed is lower than the line pressure $P_L$ in the first speed. This manner of control is advantageous in that it eliminates the need for the provision of valve means including a compensator valve and a throttle relay valve which were employed for varying the hydraulic control operation of the pressure regulator valve and provides a very compact hydraulic actuating circuit. However, the proposed hydraulic control system is disadvantageous in that a shock is developed when the manual valve is manually shifted, for example, from the neutral range position to the drive range position or from the neutral range position to the reverse range position. Further, a large shock takes place when the driving power is turned off or an upshift occurs both in a low speed range. A large shock also takes place during an automatic shift from the second to first speed in the L (low range) position of the manual valve.

SUMMARY OF THE INVENTION

With a view to eliminating the above disadvantage, it is a primary object of the present invention to provide an improved hydraulic control system for a fluid controlled automatic transmission for a vehicle in which the pressure regulator valve is controlled by a unique combination of electrical and hydraulic control means depending on the load on the engine such as the negative pressure in the air intake manifold or the opening of the engine throttle valve.

In accordance with the present invention, there is provided, in an automatic transmission of a fluid controlled type for a vehicle having a hydraulic torque converter, a gear unit, brake band means and clutch means, and fluid pressure operated servo means for said brake band means and clutch means, a hydraulic control system comprising a pressure regulator valve means for controlling fluid pressure applied to said fluid pressure operated servo means, means for detecting the load on the engine and generating an electrical signal depending on the load on the engine, a solenoid operated valve means for controlling fluid pressure in a valve chamber of said pressure regulator valve means, and an electrical circuit for controlling the operation of said solenoid operated valve means in response to the electrical signal generated by said electrical signal generating means, said solenoid operated valve means being closed and opened in response to the appearance and disappearance of the electrical signal generated depending on the load on the engine so as to vary the fluid pressure in the valve chamber of said pressure regulator valve means thereby controlling the fluid pressure applied to said fluid pressure operated servo means. By virtue of the above arrangement, the line pressure $P_L$ applied to the fluid pressure operated servo means can be most effectively controlled, depending on the running condition of the vehicle. Thus, the present invention eliminates an undesirable large shock that tends to develop during an automatic shift in the speed ratio as well as an excessively large power loss which may occur in the oil pump due to an excessively high fluid pressure and prevents an unusual slip occurring in the brake band means and clutch means due to an insufficient fluid pressure.

The above and other objects, features and advantages of the present invention will be apparent from the following detailed description of preferred embodiments thereof taken in conjunction with the accompanying drawings.

BRIEF DESCRIPTION OF THE DRAWINGS

FIGS. 3 to 8 are diagrammatic views illustrating the operating state of a hydraulic actuating circuit according to the present invention at various positions, wherein FIG. 3 illustrates the operating state in the N position with a low load on the engine, FIG. 4 the operating state at the D position—1st speed with a low load on the engine, FIG. 5 the operating state at the D position — 1st speed with a high load on the engine, FIG. 6 the operating state at the D position — 2nd speed, FIG. 7 the operating state at the D position — 3rd speed, and FIG. 8 the operating state at the R position with a low load on the engine.

DESCRIPTION OF THE PREFERRED EMBODIMENTS

Figure 1:
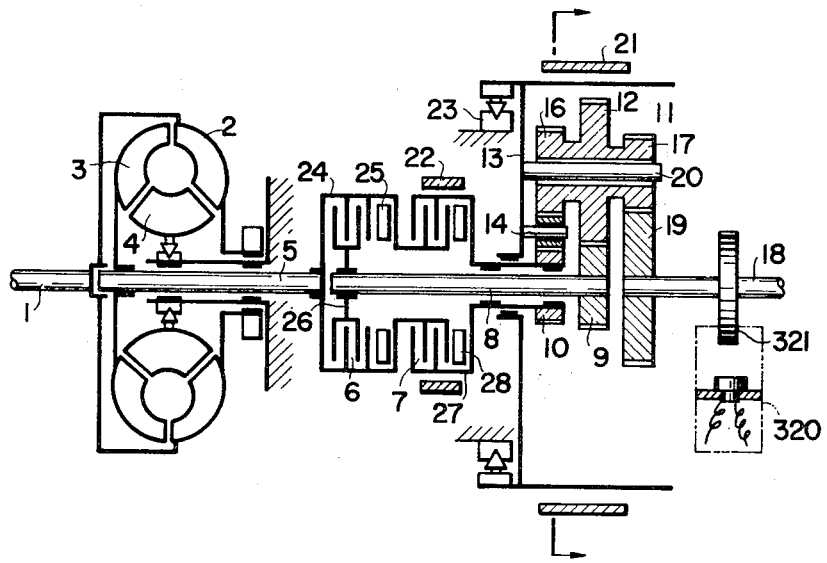
FIG. 1 is a schematic sectional view of an automatic transmission to which the present invention is applied.

A few preferred embodiments of the present invention will be described with reference to the drawings. A torque converter automatic transmission having three forward speeds and one reverse speed as shown in FIG. 1 will be taken as a typical example of the automatic transmission. In FIG. 1, the structure of such a fluid controlled automatic transmission is schematically shown.

A torque converter unit includes a pump impeller 2 directly connected to a crankshaft 1 of an engine. The power developed by the engine is transmitted from the pump impeller 2 to a turbine impeller 3 through the medium of a hydraulic fluid which, is returned to enter the pump impeller 2 again by being guided by a stator 4. A rotational force can be continuously derived from a turbine shaft 5 by the repetition of the above flow of the fluid. This rotational force is transmitted from the turbine shaft 5 to a gear unit disposed at the output side of the torque converter unit. As is commonly known, multiple disc clutch means 6 and 7 and brake band means 21 and 22 are automatically controlled by fluid pressure supplied from associated servo means as required and cooperate with a planetary gear mechanism to provide three forward speeds and one reverse speed.

The structure of the gear unit disposed at the output side of the torque converter unit will now be described. The turbine impeller 3 is connected to the turbine shaft 5 which acts as a power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and is released by means of back-up springs. The drive plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage the internally splined portion of a clutch drum 27 of the rear clutch 7. The rear clutch 7 is engaged by means of a fluid pressure actuated piston 28 and disengaged when the fluid pressure applied to the piston 28 is released.

Figure 2:
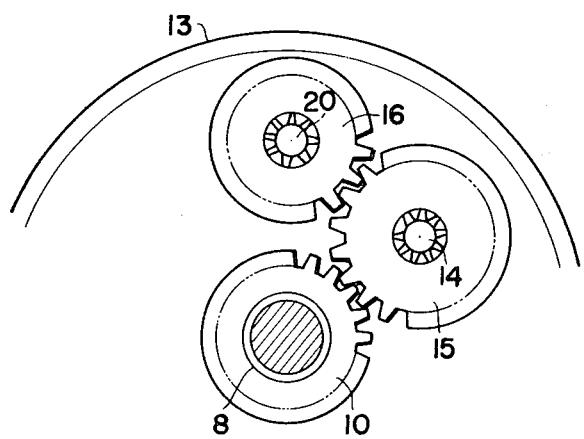
FIG. 2 is an enlarged sectional view taken on the line A—A in FIG. 1 with parts cut away to show in detail the relation between an idler gear (not shown) in FIG. 1 and the sun gear and planet pinion.

The intermediate shaft 8 which is splined to the hub 26 of the front clutch 6 is connected at its rear end to an input sun gear 9. The rear clutch drum 27 is fixed to a reverse sun gear 20 by a suitable locking means. The input sun gear 9 meshes with each gear 12 of a plurality of, for example, two or three planet pinions 11. The reverse sun gear 10 meshes with idler gears 15 (shown in FIG. 2) which are each rotatably mounted on a pin 14 fixed at one end to a carrier 13, and the idler gears 15 in turn mesh with gears 16 of the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14 respectively. A brake band 21 (hereinafter to be referred to as a rear brake band) encircles the carrier 13 for applying a brake to the latter, and thus the carrier 13 can be fixed against rotation and allowed to freely rotate by fastening and releasing the rear brake band 21. Similarly, a brake band 22 (hereinafter to be referred to as a front brake band) encircles the rear clutch drum 27 so that the rear clutch drum 27, hence the reverse sun gear 10 can be fixed against rotation and allowed to freely rotate by fastening and releasing the front brake band 22. A one-way clutch 23 associated with the carrier 13 functions in a manner similar to the rear brake band 21 in low gear set forth hereunder.

With the above structure, three forward speeds and one reverse speed can be obtained by selectively actuating the elements described above in the manner described as follows:

First speed — The front clutch 6 and the rear brake band 21 are actuated. (However, when the transmission is driven from the engine, the rear brake band 21 may not be actuated since the one-way clutch 23 is actuated to give the same result as that obtained with the actuation of the rear brake band 21. In this case, however, no driving force is transmitted from the output shaft 18.) With the front clutch 6 and the rear brake band 21 so actuated, the rotation of the turbine shaft 5 is directly transmitted to the input sun gear 9 through the front clutch 6. Due to the face that the carrier 13 is locked against rotation by the rear brake band 21, the pinion pins 20 are also held stationary and the rotation of the turbine shaft 5 is transmitted from the gear 9 to the gears 12, thence through the gears 17 to the gear 19 mounted on the output shaft 18 in a speed reducing relation similar to that of an ordinary gear train, thereby providing the first speed.

Second speed — The front clutch 6 is kept actuated and the front brake band 22 is actuated while releasing the gear brake band 21. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the sun gear 9 urges the pinions 11 to rotate in a direction (counterclockwise) opposite to the direction of rotation (clockwise) of the turbine shaft 5. The planet pinions 11 rotating in this direction try to rotate the idler gears 15 clockwise through the gears 16. However, due to the fact that the gear 10 meshing with the gears 15 is locked against rotation, the pinion pins 14 revolve clockwise around the gear 10. This revolving motion is imparted to the rotation of the input sun gear 9 and the gear 19 carried by the output shaft 18 which gears are coaxial with and rotate in the same direction as the turbine shaft 5. Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed — The third speed can be obtained by engaging both the front and rear clutches 6 and 7. The input sun gear 9 and the reverse sun gear 10 are rotated in unison and the whole planetary gear system is unitarily rotated so that the output shaft 18 is rotated at the rotating speed of the turbine shaft 5.

Reverse — When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the pinions 15 and 17 to the gear 19 mounted on the output shaft 18 so that the output shaft 18 is rotated in the reverse direction.

A hydraulic actuating system for supplying and discharging fluid under pressure to and from the brake bands 21 and 22 and the clutches 6 and 7 in the automatic transmission for carrying out an automatic shift will next be described. The arrangement of one form of the hydraulic actuating system according to the present invention is diagrammatically shown in FIGS. 3 to 8. Briefly, the hydraulic actuating system comprises a fluid pressure source 100 and a hydraulic actuating circuit 110. The hydraulic actuating circuit 110 includes a manual valve 120, a 1-2 shift means 130, a 2-3 shift means 135, a first check valve 140 and fluid passages. The fluid pressure source 100 includes an oil pump 101, an oil strainer 102, a pressure regulator valve 105, a solenoid operated valve means 150, a second check valve 103, an oil cooler 104, a third check valve 107 and fluid passages. The fluid pressure source 100 functions to supply fluid under pressure to the torque converter, to the gears for lubricating same and to the hydraulic actuating circuit 110.

Figure 3:
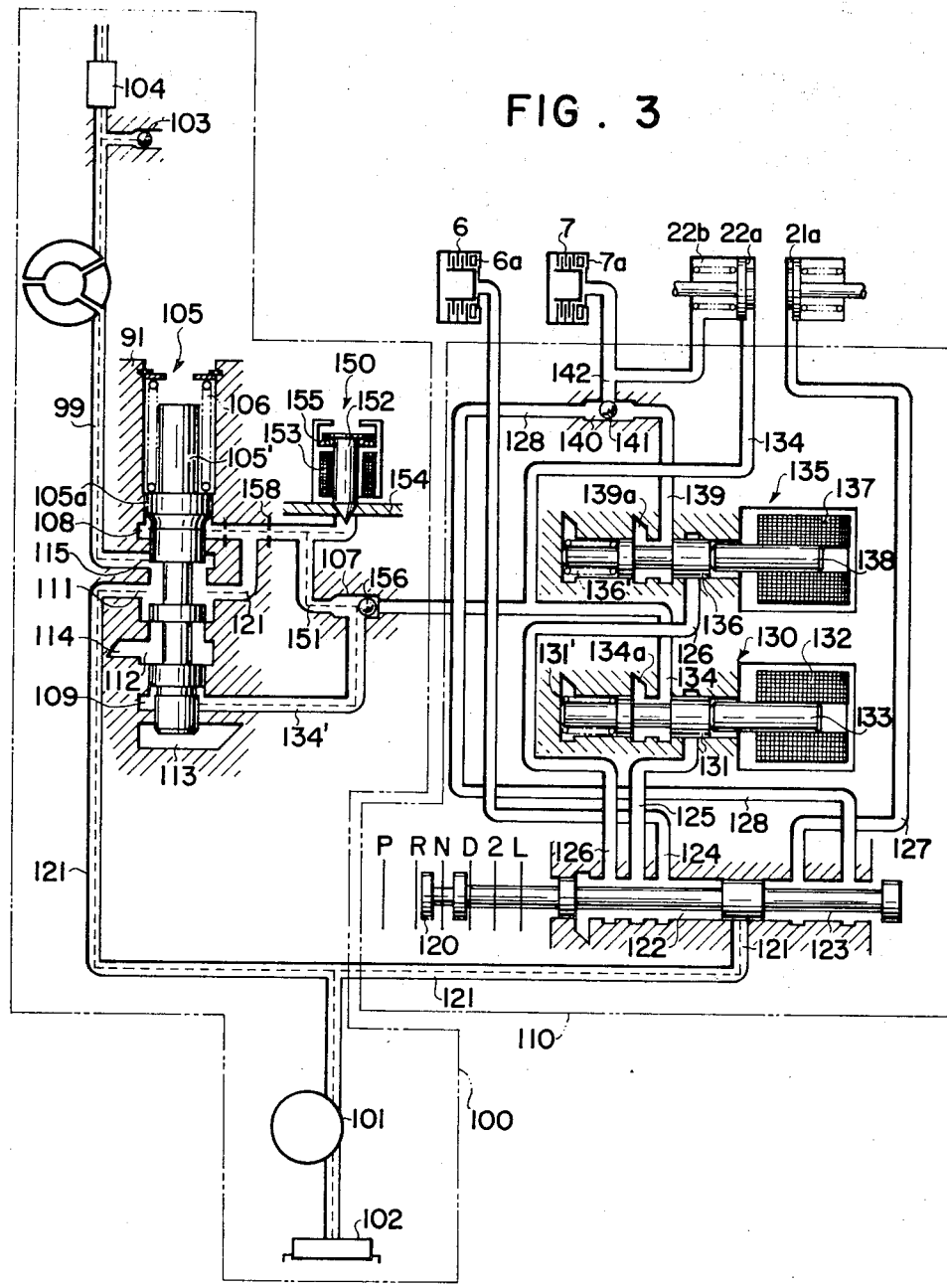

The manual valve 120 is connected with a shift lever (not shown) disposed adjacent to the driver's seat and takes one of the six positions, that is, the P (parking range), R (reverse range), N (neutral range), D (drive range), 2 (second range) and L (low range) positions. When now the manual valve 120 takes the N position, a fluid passage 121 is closed and valve chambers 122 and 123 are exhausted as seen in FIG. 3. At the D position of the manual valve 120, the fluid passage 121 communicates with fluid passages 124, 125 and 126 as seen in FIGS. 4 to 7. The fluid passage 124 leads directly to a front clutch servo chamber 6a, and the fluid passage 125 leads to the apply side 22a of a servo for the front brake band 22 through the 1-2 shift means 130, while the fluid passage 126 leads to a rear clutch servo chamber 7a and to the release side 22b of the servo for the front brake band 22 through the 2-3 shift means 135 and the check valve 140. The 1-2 shift means 130 includes a 1-2 shift valve element 131 and a solenoid 132. One end (or the right-hand end as viewed in the drawing) of the valve element 131 is abutted by a moving core 133 of the solenoid 132. When no current is supplied to the solenoid 132, the valve element 131 is urged to its rightward position by a spring 131' engaging the other or left-hand end of the valve element 131 so that the fluid passage 125 communicates with a fluid passage 134 to supply fluid to the apply side 22a of the servo for the front brake band 22 to apply the front brake band 22. When current is supplied to the solenoid 132, the moving core 133 urges the valve element 131 to the leftward position by being actuated by the electromagnetic force of the solenoid 132 so that the communication between the fluid passages 125 and 134 is interrupted and the fluid passage 134 communicates with a pressure discharge port 134a to release the front brake band 22. Similarly, the 2-3 shift means 135 includes a 2-3 shift valve element 136 and a solenoid 137. One end (or the right-hand end as viewed in the drawing) of the valve element 136 is engaged by a moving core 138 of the solenoid 137. When no current is supplied to the solenoid 137, the valve element 136 is urged to its rightward position by a spring 136' engaging the other or left-hand end of the valve element 136 so that the fluid passage 126 communicates with a fluid passage 139 to force a check ball element 141 of the check valve 140 toward a fluid passage 128 to block the fluid passage 128. As a result, the fluid passage 139 communicates with a fluid passage 142 to supply fluid to the rear clutch servo chamber 7a and to the release side 22b of the servo for the front brake band 22 so as to engage the rear clutch 7 and release the front brake band 22. When current is supplied to the solenoid 137, the valve element 136 is urged leftward so that the communication between the fluid passages 126 and 139 is interrupted and the fluid passage 139 communicates with a pressure discharge port 139a to be exhausted.

Figure 4:
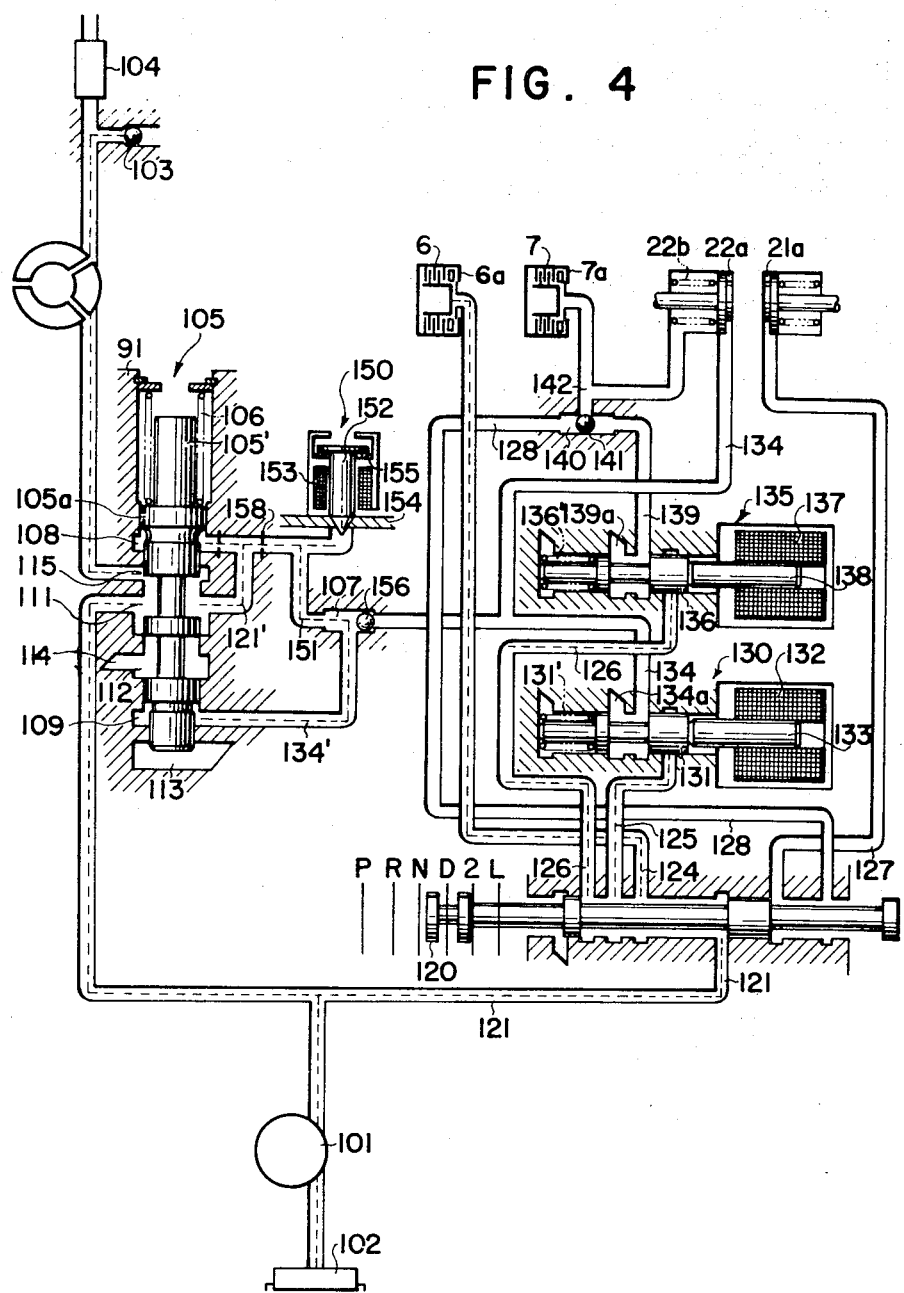
Figure 5:
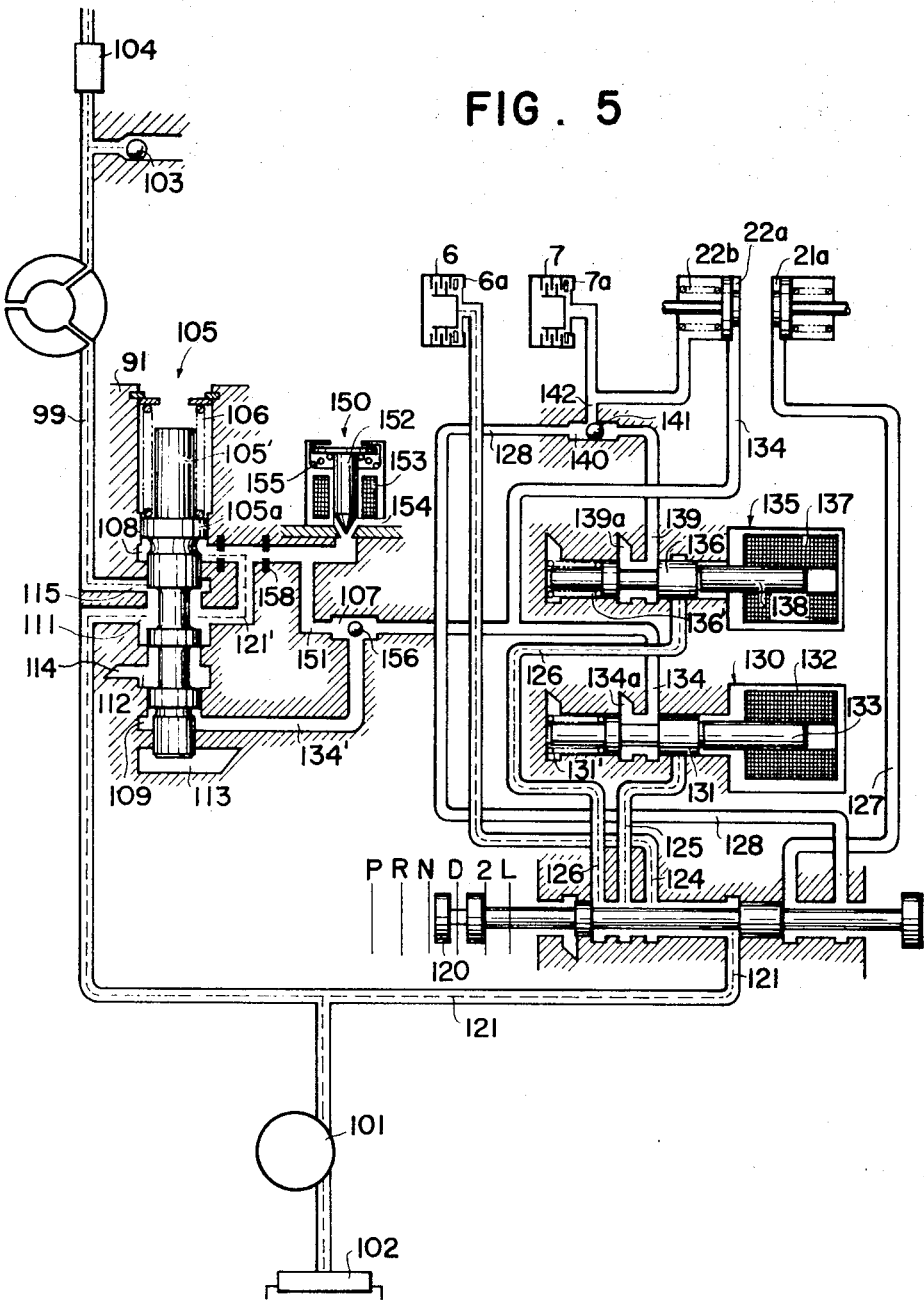

In the first speed at the drive range position or D position — 1st speed shown in FIGS. 4 and 5, both the solenoids 132 and 137 are energized and the front clutch 6 is solely engaged by the supply of fluid from the manual valve 120 to the front clutch servo chamber 6a through the fluid passage 124. Accordingly, when the transmission is driven from the engine, the one-way clutch 23 is engaged to lock the carrier 13 against rotation so that the first speed can be obtained. In this case, however, no driving force can be transmitted from the output shaft 18 since a "freewheeling" condition appears.

Figure 6:
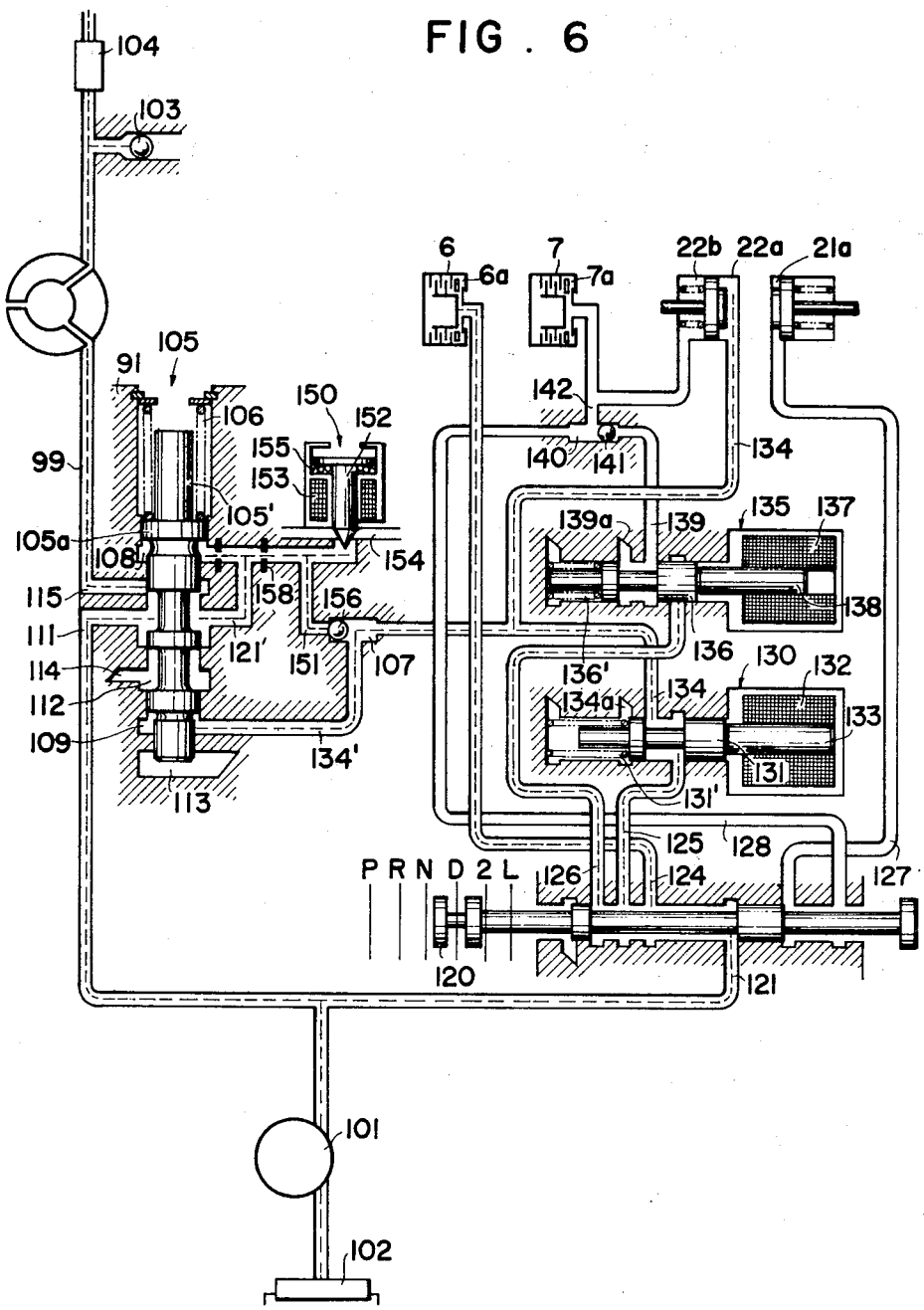

In the second speed at the drive range position or D position — 2nd speed shown in FIG. 6, the fluid passage 124 leading to the front clutch servo chamber 6a is kept pressurized and the solenoid 132 for the 1-2 shift valve element 131 is de-energized with the result that the fluid passage 125 communicates with the fluid passage 134 to supply fluid to the apply side 22a of the servo for the front brake band 22 to apply the front brake band 22. Thus, the second speed can be obtained.

Figure 7:
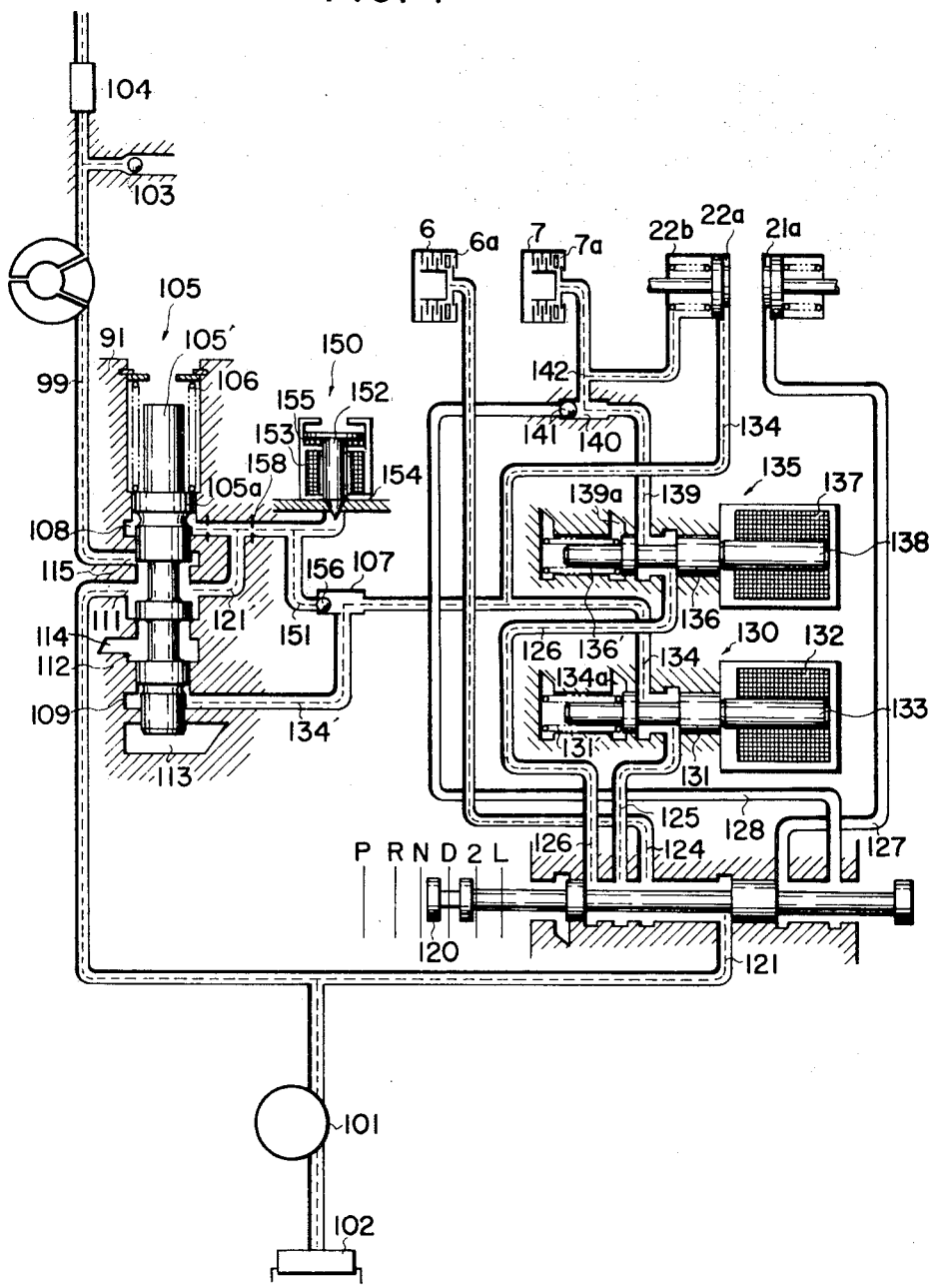

In the third speed at the drive range position or D position — 3rd speed shown in FIG. 7, the solenoid 137 for the 2-3 shift valve element 136 is de-energized in addition to the previous de-energization of the solenoid 132 in the D position — 2nd speed with the result that the fluid passage 126 communicates with the fluid passage 139 to supply fluid to the rear clutch servo chamber 7a to engage the rear clutch 7 while releasing the front brake band 22. Thus, the third speed can be obtained.

When the manual valve 120 is urged to the 2 position, the fluid passage 126 leading to the 2-3 shift means 135 is exhausted and the fluid passages 124 and 125 communicate solely with the fluid pressure source 100. Accordingly, it is impossible to obtain the third speed regardless of the de-energization of the solenoid 137 for the 2-3 shift valve element 136 and the first and second speeds can be obtained depending on the energization and de-energization of the solenoid 132 for the 1-2 shift valve element 131.

When the manual valve 120 is urged to the L position, the fluid passages 125 and 126 are exhausted and the fluid passages 124 and 127 communicate with the fluid pressure source 100. As a result, fluid is supplied to the front clutch servo chamber 6a and to the apply side 21a of a servo for the rear brake band 21 to engage the front clutch 6 and apply the rear brake band 21. Thus, the first speed can be obtained. The first speed in this case differs from the first speed in the D position in that the rear brake band 21 is applied to provide for transmission of the driving force from the output shaft 18 to the engine thereby permitting the application of engine braking.

Figure 8:
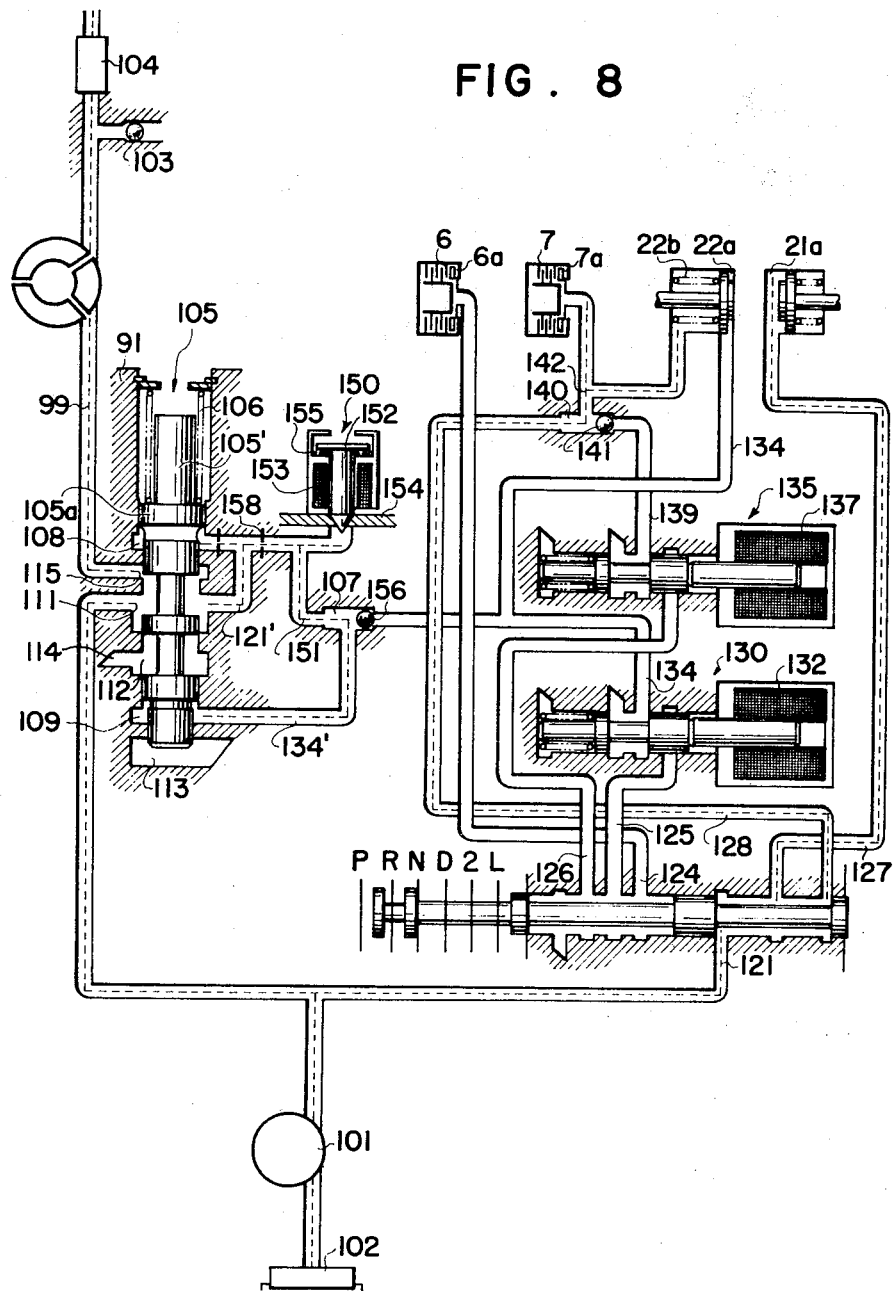

When the manual valve 120 is moved to the R position shown in FIG. 8, the fluid passages 124, 125 and 126 are exhausted and the fluid passages 127 and 128 communicate with the fluid pressure source 100. As a result, fluid is supplied to the rear clutch servo chamber 7a and to the apply side 21a of the servo for the rear brake band 21 to engage the rear clutch 7 and apply the rear brake band 21. Thus, the reverse driving condition for the vehicle can be obtained.

It will be understood from the above description that the 1-2 shift means 130 and the 2-3 shift means 135 are operated to carry out the automatic speed changing operation and this is accomplished by selectively energizing and de-energizing the solenoids 132 and 137. The shift control by supplying current and interrupting the supply of current to the solenoids 132 and 137 is carried out depending on the running condition of the vehicle, and various methods for the shift control have been proposed heretofore and are well known in the art. For example, U.S. Pats. Nos. 3,068,715 and 3,019,666 disclose such methods, and it is expected that novel methods for shift control will be developed in the future with the progress in electronic devices. However, any method for shift control that may be developed in the future is applicable to the present invention in so far as it does not impair the performance of the transmission disclosed herein.

Figure 10:
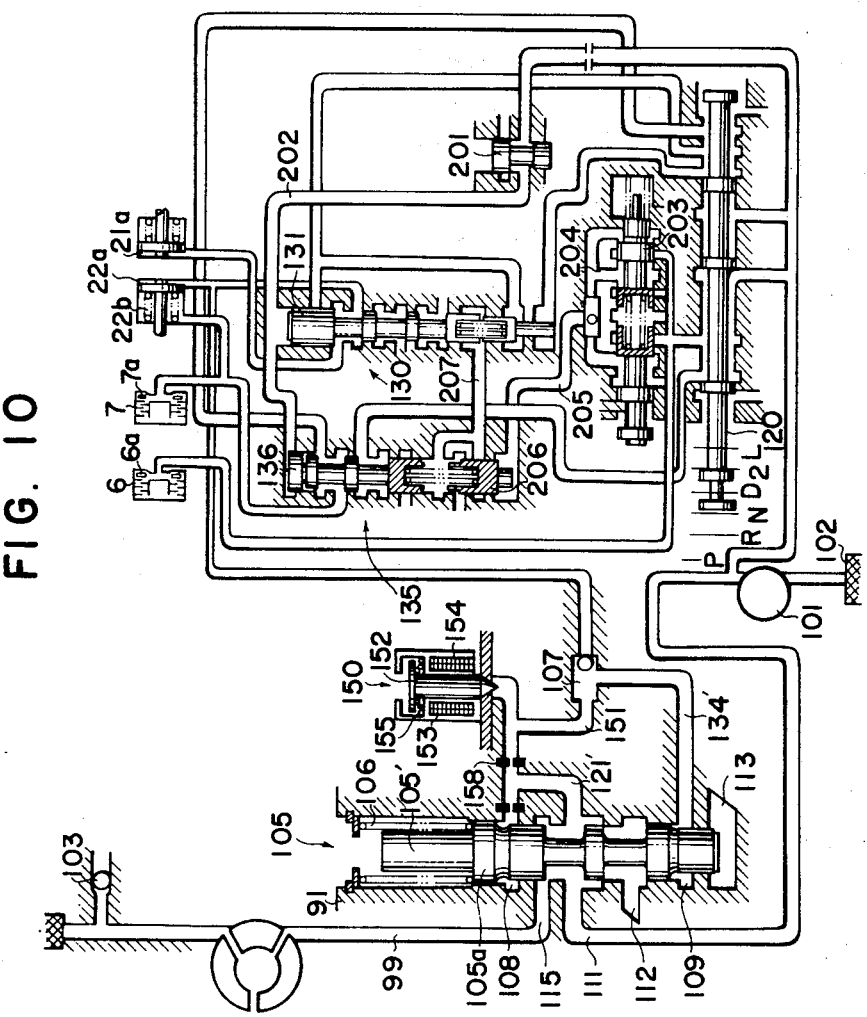
FIG. 10 is a diagrammatic view of another embodiment of the hydraulic actuating circuit according to the present invention, illustrating the operating state at the D position — 1st speed with a low load on the engine.

FIG. 10 shows diagrammatically another embodiment of the present invention and like reference numerals are used therein to denote like parts appearing in FIGS. 3 to 8. While the preceding embodiment has referred to the case in which the solenoids 132 and 137 associated with the respective shift valve elements 131 and 136 are selectively energized and de-energized for the electrical shift control, the embodiment shown in FIG. 10 relates to a system in which these shift valve elements are selectively hydraulically actuated by fluid pressure depending on the running condition of the vehicle as is the case with conventional control systems.

Referring to FIG. 10, a governor pressure $P_{go}$ responsive to the vehicle speed is produced at a governor valve 201 and is applied by way of a fluid passage 202 to fluid chambers adjacent to one end of a 1-2 shift valve element 131 and a 2-3 shift valve element 136. On the other hand, a throttle pressure $P_{th}$ responsive to the position of the engine throttle valve is produced at a throttle valve 203 operatively connected with the engine throttle valve. Therefore, a pressure responsive to the position of the accelerator pedal is applied by way of fluid passages 204 and 205 to fluid chambers adjacent to the other end of the 1-2 shift valve element 131 and the 2-3 shift valve element 136. Thus, the governor pressure $P_{go}$ and the throttle pressure $P_{th}$ are applied to the fluid chambers adjacent to the opposite ends of the 1-2 shift valve element 131 and the 2-3 shift valve element 136 to move these valve elements in either direction depending on the relation between the vehicle speed and the position of the engine throttle valve. While FIG. 10 shows the operating state of the hydraulic actuating circuit at the D position — 1st speed, it is apparent that a manual valve 120 can take any one of the P, R, N, D, 2 and L positions and the hydraulic actuating circuit can operate in a manner similar to that described in the preceding embodiment. In the hydraulic actuating circuit shown in FIG. 10, the throttle pressure $P_{th}$ appearing in the fluid passage 105 is modulated or reduced by a valve 106 into a modulated throttle pressure $P_{mth}$ of constant magnitude and this modulated throttle pressure $P_{mth}$ appears in a fluid passage 207 to be applied to the corresponding end of the shift valve elements 131 and 136.

Figure 11A:
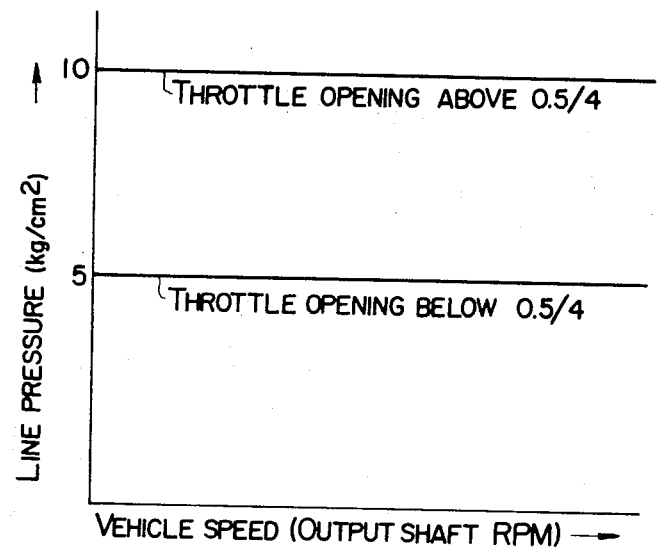
FIGS. 11a and 11b are charts showing the variation in the line pressure $P_L$ controlled by the hydraulic actuating circuit relative to the number of revolutions of the output shaft.
Figure 11B:
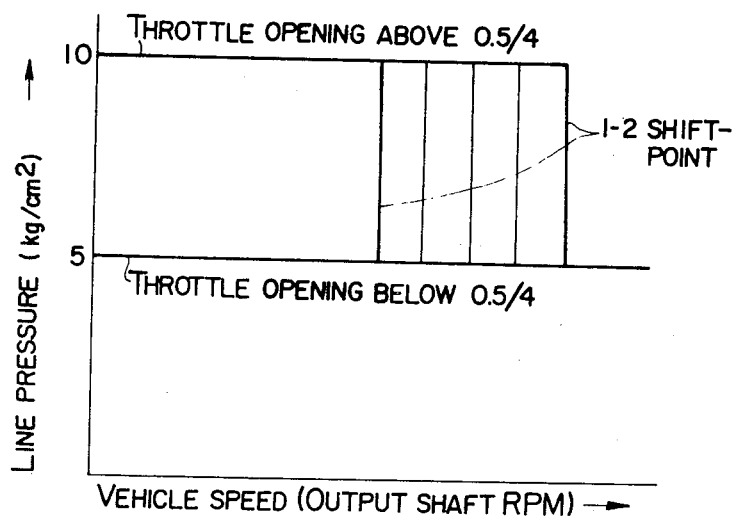

The fluid pressure or line pressure $P_L$ applied to the servos for the brake bands and multiple disc clutches for carrying out the speed changing operation is controlled by the pressure regulator valve 105. The present invention is featured by controlling the line pressure $P_L$ by means of the pressure regulator valve 105 so as to obtain a fluid pressure characteristic as shown in FIGS. 11a and 11b.

The structure and operation of the pressure regulator valve 105 which is an important feature of the present invention will be described with reference to FIGS. 3 to 8, and more especially to FIGS. 4 to 6. The pressure regulator valve 105 comprises a valve body 91, a valve spool 105', a coil spring 106 compressed between one or upper end of the valve spool 105' and the valve body 91, and six fluid chambers 108, 115, 111, 112, 109 and 113 arranged in this order from above. The fluid chamber 112 communicates with a pressure discharge port 114 for returning fluid to the oil reservoir. When the valve spool 105' of the pressure regulator valve 105 is in its upper position, the fluid chamber 112 communicates with the fluid chamber 111 to discharge a controlled amount of fluid from the fluid chamber 111 to the oil reservoir. The fluid chamber 111 is connected to the fluid chamber 108 by a fluid passage 121'. The fluid chamber 111 is further connected to the fluid passage 121 which supplies fluid under pressure pumped up by the oil pump 101. When the valve spool 105' is in its upper position, the fluid chamber 115 supplies fluid into a fluid circulating passage 99 leading to the torque converter. The fluid chamber 109 is connected to the third check valve 107 having a check ball element 156 therein, thence to the fluid passages 134 and 151. The fluid chamber 113 is always exhausted.

The line pressure $P_L$ regulated by the pressure regulator valve 105, that is, the fluid pressure supplied from the fluid chamber 111 into the fluid passage 121 is determined by the combination of the downward force F of the coil spring 106 disposed between the upper end of the valve spool 105' and the valve body 91, the fluid pressure $P_1$ in the fluid chamber 108 acting upwardly on the valve spool 105', and the fluid pressure $P_2$ in the fluid chamber 109 acting upwardly on the valve spool 105'. Suppose that $\Delta A_1$ is the difference between the cross-sectional areas of the portion of the valve spool 105' fitting in the fluid chamber 108, and $\Delta A_2$ is the difference between the cross-sectional areas of the portion of the valve spool 105' fitting in the fluid chamber 109. Then, the following equation holds:

$$F = \Delta A_1 \times P_1 + \Delta A_2 \times P_2 \qquad (1)$$

Since the fluid chamber 108 communicates with the fluid chamber 111 by the fluid passage 121', the following equation holds:

$$P_1 = P_2 \qquad (2)$$

The fluid pressure $P_2$ in the fluid chamber 109 will now be considered. The fluid chamber 109 is connected to the 1-2 shift means 130 through the fluid passage 134', the third check valve 107 and the fluid passage 134. The fluid passage 134 supplies the fluid pressure appearing in the fluid passage 125 to the apply side 22a of the servo for the front brake band 22 in response to the actuation of the shift valve element 131 of the 1-2 shift means 130 by the solenoid 132. When the 1-2 shift valve element 131 is thus actuated to provide the second speed, fluid under line pressure $P_L$ is supplied into the fluid chamber 109 by way of the fluid passages 134 and 134'. Conversely, in the first speed position of the hydraulic actuating circuit, the fluid passage 134 is exhausted through the pressure discharge port 134a and therefore the fluid chamber 109 is also exhausted. In the third speed position of the hydraulic actuating circuit, the 1-2 shift means 130 remains in the same state as when the hydraulic actuating circuit is in the second speed position, and fluid under line pressure $P_L$ is supplied into the fluid chamber 109 as in the case of the second speed.

The fluid chamber 109 is connected through the fluid passage 134' and the third check valve 107 to the fluid passage 151. The fluid passage 151 is divided into two branch passages one of which leads to the fluid chamber 111 through an orifice 158 and the fluid passage 121', while the other leads to the solenoid operated valve means 150. The solenoid operated valve means 150 comprises a valve element 152, a solenoid 153, a discharge port 154 operatively closed by the valve element 152, and a spring 155 normally urging the valve element 152 upwardly. Current is supplied to the solenoid 153 in a manner as will be described later when the load on the engine is low, and thus the valve element 152 is forced downwardly to close the discharge port 154. In this case, the fluid pressure in the fluid passage 151 is equal to the fluid pressure in the fluid chamber 111. That is, the fluid pressure in the fluid passage 151 is equal to the line pressure $P_L$. Therefore, the fluid pressure $P_2$ in the fluid chamber 109 is also equal to the line pressure $P_L$. The solenoid 153 is de-energized when the load on the engine is high. Therefore, the valve element 152 is forced upwardly by the combined action of the fluid pressure and the force of the spring 155 so that fluid is discharged through the discharge port 154. The discharge port 154 has an area which is sufficiently larger than the flow limiting area of the orifice 158 so as to release the fluid pressure in the fluid passage 151. Therefore, the fluid pressure $P_2$ in the fluid chamber 109 is zero in the high engine load range except in the second and third speed, that is, except the case in which the check ball element 156 of the third check valve 107 is forced leftward to block the fluid passage 151. From the above explanation, it is apparent that the line pressure $P_L$ when $P_2 = 0$ and $P_2 = P_L$ is given by the following Equations (3) and (4) respectively:

$$P_L = (F)/(\Delta A_1) \qquad (3)$$

$$P_L = (F)/(\Delta A_1 + \Delta A_2) \qquad (4)$$

It will be seen that the line pressure $P_L$ has a higher constant value when the fluid pressure $P_2$ does not exist in the fluid chamber 109 than when the fluid pressure $P_2$ exists in the fluid chamber 109. The magnitude of the line pressure $P_L$ relative to the position of the manual valve 120 is summarized in Table 1.

TABLE 1

| Position of manual valve | Speed | Engine Load | Line pressure |
|---|---|---|---|
| D range | 1st speed | High | $F/\Delta A_1$ |
|  |  | Low | $F/(\Delta A_1 + \Delta A_2)$ |
|  | 2nd speed | No relation with load | $F/(\Delta A_1 + \Delta A_2)$ |
|  | 3rd speed | No relation with load | $F/(\Delta A_1 + \Delta A_2)$ |
| 2nd range | 1st speed | High | $F/\Delta A_1$ |
|  |  | Low | $F/(\Delta A_1 + \Delta A_2)$ |
| L and R ranges | 2nd speed | No relation with load | $F/(\Delta A_1 + \Delta A_2)$ |
|  |  | High | $F/\Delta A_1$ |
|  |  | Low | $F/(\Delta A_1 + \Delta A_2)$ |
| N range |  | High | $F/\Delta A_1$ |
|  |  | Low | $F/(\Delta A_1 + \Delta A_2)$ |

FIGS. 11a and 11b are charts showing the line pressure $P_L$ shown in Table 1. In FIGS. 11a and 11b, it is defined that the load on the engine is high when the opening of the throttle valve is more than 0.5/4, while the load on the engine is low when the opening of the throttle valve is less than 0.5/4. The line pressure $P_L =$ $F/\Delta A_1$ corresponding to $P_2 = 0$ is 10 kg/cm², while the line pressure $P_L = F/(\Delta A_1 + \Delta A_2)$ corresponding to $P_2 = P_L$ is 5 kg/cm². FIG. 11a shows the line pressure $P_L$ when the position of the manual valve 120 is in the L, R and N ranges, while FIG. 11b shows the line pressure $P_L$ when the position of the manual valve 120 is in the D and 2 ranges. It will be seen from FIG. 11a that, in the L, R and N ranges, the 1–2 shift means 130 is not actuated, the fluid passage 134 is kept exhausted and the check ball element 156 of the third check valve 107 is in its rightward position to allow for communication between the fluid passages 134' and 151 so that the fluid pressure in the fluid chamber 109 of the pressure regulator valve 105 is controlled solely by the solenoid operated valve means 150. Since the solenoid operated valve means 150 is energized or de-energized depending on the load on the engine, the line pressure $P_L$ is represented by two lines which are not subject to any change and are independent of the vehicle speed as seen in FIG. 11a. More precisely, the line pressure $P_L$ is continuously kept at 10 kg/cm² when the load on the engine is high due to the large opening of the engine throttle valve of more than 0.5/4, while the line pressure $P_L$ is continuously kept at 5 kg/cm² when the load on the engine is low due to the small opening of the engine throttle valve of less than 0.5/4.

In the case of the D or 2 range shown in FIG. 11b, the operation of the 1–2 shift means 130 is added to the operation of the above means. Suppose that the fluid pressure $P_2$ in the fluid chamber 109 of the pressure regulator valve 105 is zero when the load on the engine is high due to the large opening of the engine throttle valve of more than 0.5/4. When the speed ratio is changed from the first to second speed due to the de-energization of the solenoid 132 of the 1–2 shift means 130, fluid under line pressure $P_L$ is supplied from the fluid passage 125 to the fluid passage 134. The check ball element 156 of the third check valve 107 is forced to its leftward position by the line pressure $P_L$ so that the fluid under line pressure $P_L$ is supplied through the fluid passage 134' into the fluid chamber 109 of the pressure regulator valve 105. This is the same as when the load on the engine is low in the L, R and N ranges due to the small opening of the engine throttle valve of less than 0.5/4, and thus the line pressure $P_L$ steps down from 10 kg/cm² to 5 kg/cm² as seen in FIG. 11b. When the load on the engine is low in the D and 2 ranges due to the small opening of the engine throttle valve of less than 0.5/4, the line pressure $P_L$ is continuously kept at 5 kg/cm² and is not subject to any change at any vehicle speed.

It will be seen that the line pressure $P_L$ steps down from a constant high pressure to a constant low pressure in response to the de-energization of the solenoid 132 of the 1–2 shift means 130 when the load on the engine in the D or 2 range is high due to the large opening of the engine throttle valve of more than 0.5/4. However, the 1–2 shift point is generally variable depending on an engine torque responsive signal. Thus, the point at which the step-down occurs from the constant high pressure to the constant low pressure varies depending on the engine torque responsive signal. The step-down occurs earlier with a smaller opening of the engine throttle valve and is gradually retarded with the increase in the opening of the engine throttle valve. A fluid pressure control similar to that described above is also carried out in another embodiment of the present invention is shown in FIG. 10.

The fluid pressure regulating action of the pressure regulator valve 105 is such that a controlled amount of fluid is discharged from the fluid chamber 111 into the fluid chamber 112, thence into the discharge port 114 depending on the fluid pressure in the fluid chamber 108. That is, the manner of fluid pressure control is such that the fluid flow between the fluid chambers 111 and 112 is limited to a very small amount or is completely shut off to quickly raise the fluid pressure in the fluid chamber 108 when an insufficient fluid pressure exists in the fluid chamber 108, while the fluid flow between the fluid chambers 111 and 112 is increased to discharge a large amount of fluid from the fluid chamber 111 to the fluid chamber 112 when an excessively large fluid pressure exists in the fluid chamber 108. The change-over between the two line pressure levels by the operation of the 1–2 shift means 130 only occurs in the D or 2 position of the manual valve 120 in which fluid under pressure is supplied to the fluid passage 125 leading to the 1–2 shift valve element 131. In the N or R position of the manual valve 120, no fluid is supplied to the 1–2 shift means 130. Therefore, the 1–2 shift means 130 does not participate in the change-over between the two line pressure levels, and the change-over is effected by the operation of the solenoid operated valve means 150. In the event of trouble in the electrical circuit, no current is supplied to the solenoid 153 of the solenoid operated valve means 150. It is another important feature of the present invention that, in this instance, the valve element 152 is urged upwardly by the force of the spring 155 to discharge fluid out of the fluid chamber 109 so that the line pressure $P_L$ has a relatively high value thereby providing for safe operation of the system.

Generally, the number of revolutions of the oil pump is low in the idling state of the engine so that the line pressure $P_L$ may be reduced in the idling state and the amount of fluid supplied to the line 99 leading to the torque converter may be reduced. Thus, it is undesirable to discharge fluid from the solenoid operated valve means 150. However, the present invention is free from such trouble because the valve element 152 of the solenoid operated valve means 150 is in its closed position in the idling state of the engine.

As described above, the solenoid operated valve means 150 is provided for the purpose of controlling the line pressure $P_L$ produced by the pressure regulator valve 105. One form of an electrical circuit for energizing the solenoid operated valve means 150 depending on the load on the engine will be described with reference to FIG. 9. The electrical circuit includes a switch 501 such as, for example, a reed switch which is urged to the closed position when the opening of the engine throttle valve exceeds 0.5/4, a pair of transistors 502 and 503 acting as a semiconductor relay, a coil 504 of the solenoid operated valve means 150, a diode 507 for absorbing the counter-electromotive force produced in the coil 504 thereby protecting the transistor 503 against damage, positive terminals 505 and 506 of a power supply, and resistors 508–513. In operation, when the opening of the engine throttle valve is less than 0.5/4 or the engine throttle valve is nearly fully closed, the switch 501 is in its open position and no base current is supplied to the first transistor 502 so that the transistor 502 is in the cut-off state, while base current is supplied to the second transistor 503 to turn on the transistor 503 so that the solenoid coil 504 is energized. In the throttle opening range of from 0.5/4 to the full open position, the switch 501 is urged to its closed position to supply base current to the first transistor 502 thereby turning on the transistor 502. Since the collector of the transistor 502 is grounded, no base current is supplied to the second transistor 503 thereby turning off the transistor 503 and the solenoid coil 504 is de-energized. The use of the reed switch for detecting the position of the engine throttle valve is advantageous in that a stable signal can be obtained by the hysteresis characteristic of the reed switch and any special means for providing the desired hysteresis need not be provided in the circuit.

While preferred embodiments of the present invention have been described in detail in the above, various changes and modifications may be made therein as follows:

A. In the hydraulic control system described above, the desired fluid pressure control has been accomplished by the cooperation of the 1-2 shift means 130 and the solenoid operated valve means 150. In a modification of the present invention, the fluid passage 134 leading out of the 1-2 shift valve means 130 is disconnected from the fluid passage 134' and the solenoid operated valve means 150 solely carries out the desired fluid pressure control. In this case, the fluid pressure characteristic in the D or 2 range is the same as that shown in FIG. 11a for the L, R and N ranges.

Figure 9:
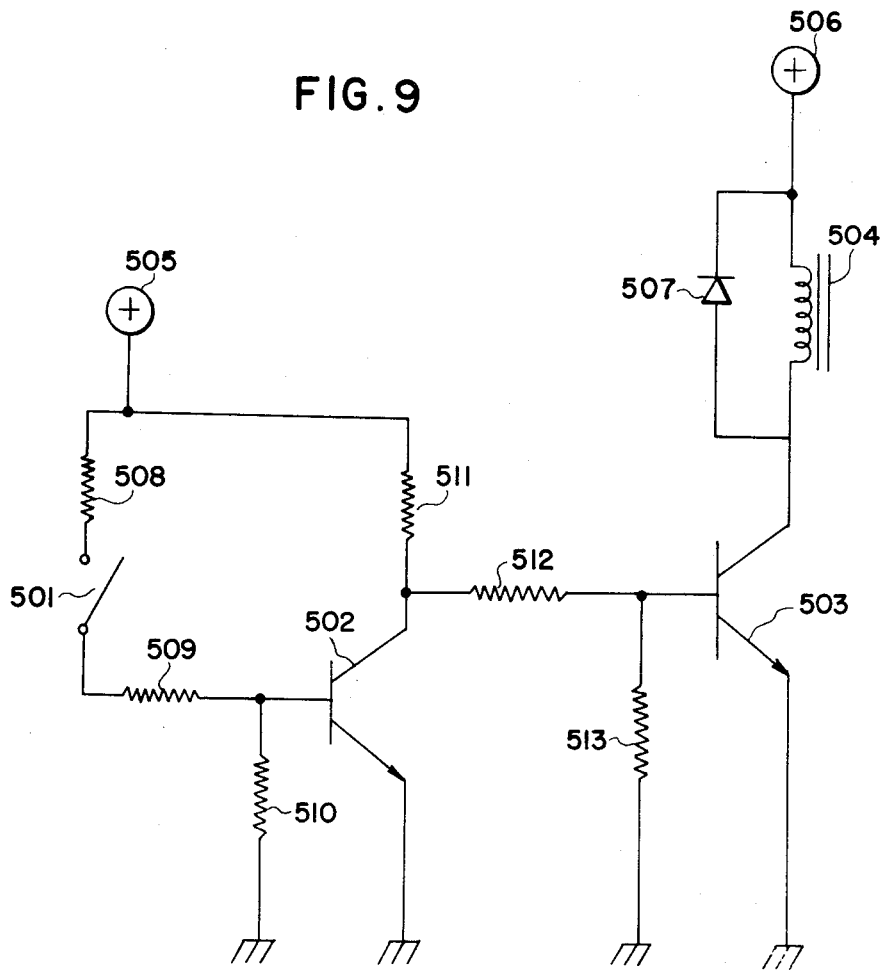
FIG. 9 is a circuit diagram of an electrical circuit for controlling the operation of the solenoid operated valve means.

B. The switch 501 shown in FIG. 9 is responsive to the position of the engine throttle valve. In another modification of the present invention, this switch is replaced by a switch which is responsive to the negative pressure in the air intake manifold of the engine.

Figure 12:
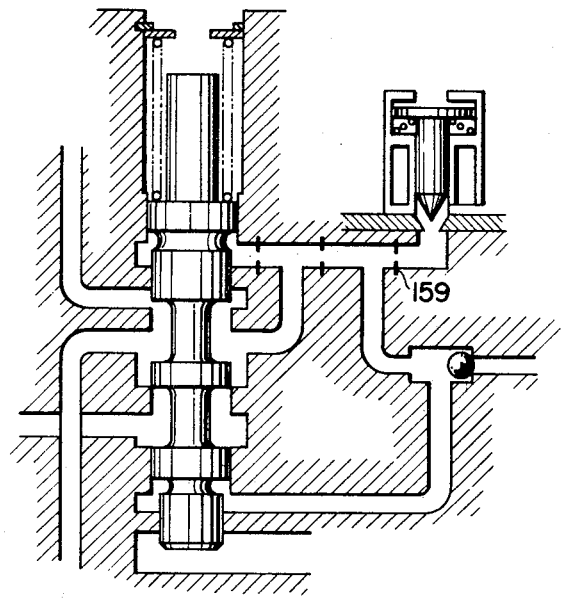
FIG. 12 is a diagrammatic view showing a partial modification of the hydraulic actuating circuit in the vicinity of the pressure regulator valve means.
Figure 13:
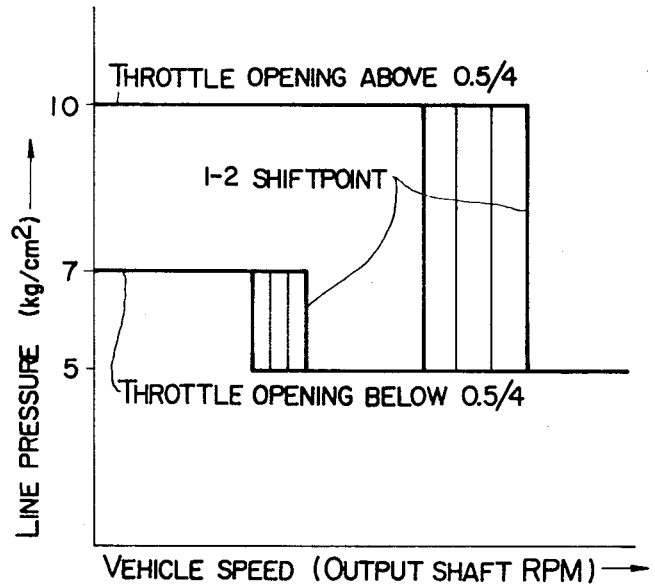
FIG. 13 is a chart showing the variation in the line pressure $P_L$ controlled by the modified hydraulic actuating circuit shown in FIG. 12 relative to the number of revolutions of the output shaft.

C. The hydraulic control system described above has been so designed that the fluid chamber 109 is completely exhausted when the solenoid operated valve means 150 is de-energized. In a further modification as shown in FIG. 12, an orifice 159 is additionally provided so that the fluid pressure $P_2$ in the fluid chamber 109 is not completely reduced to zero but is reduced to a certain valve slightly higher than zero. In this case, the line pressure $P_L$ varies in a manner as shown in FIG. 13. This line pressure characteristic is desirable in some cases. Further, a practical means for actuating the reed switch 501 shown in FIG. 9 may include a magnet which rotates with the throttle link so that the reed switch 501 is turned on when the magnet is rotated to a position corresponding to the throttle opening of 0.5/4.

D. The hydraulic control system described above has included only one solenoid operated valve means 150 for the change-over of the line pressure from one level to the other. Another modification of the present invention may include two or more solenoid operated valve means 150 for the change-over of the line pressure over a plurality of levels.

Figure 14:
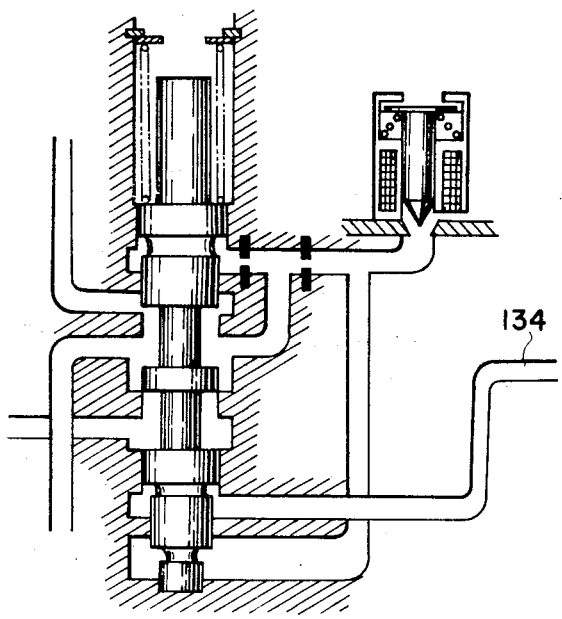
FIG. 14 is a diagrammatic view showing another partial modification of the hydraulic actuating circuit.
Figure 15:
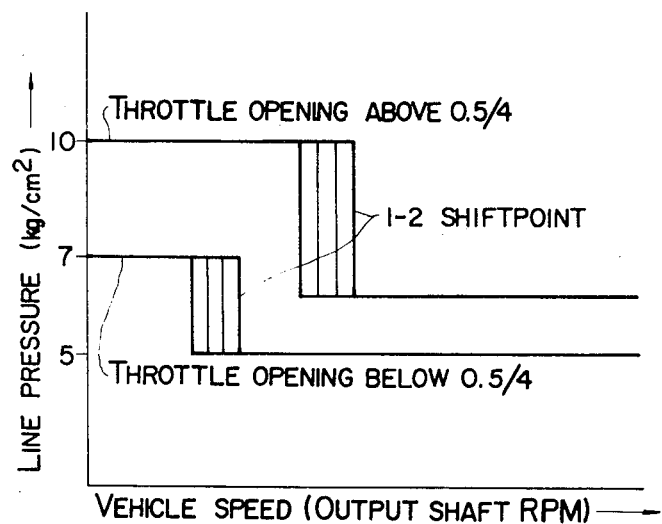
FIG. 15 is a chart showing the variation in the line pressure $P_L$ controlled by the modified hydraulic actuating circuit shown in FIG. 14 relative to the number of revolutions of the output shaft.

E. The hydraulic control system described above has been so designed that both the solenoid operated valve means 150 and the 1-2 shift valve means 130 are connected to the same fluid chamber 109 for the change-over of the line pressure. In a further modification of the present invention, the solenoid operated valve means 150 and the 1-2 shift valve means 130 are connected to separate fluid chambers as shown in FIG. 14. In this case, the line pressure varies in a manner as shown in FIG. 15. This line pressure characteristic is desirable in some cases.

Figure 16:
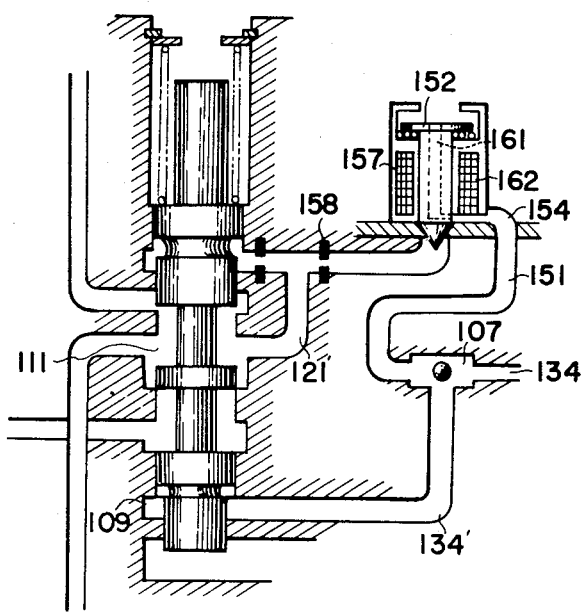
FIG. 16 is a diagrammatic view showing a further partial modification of the hydraulic actuating circuit.

F. The hydraulic control system described above has been so designed that fluid under line pressure $P_L$ is normally discharged from the discharge port 154 when the valve element 152 in the solenoid operated valve means 150 takes its upper position. However, this arrangement is not necessarily desirable when the capacity of the oil pump is insufficient or small. A still further modification of the present invention having an arrangement as shown in FIG. 16 is preferred to deal with such a case. In FIG. 16, the fluid flow through the fluid passage 121' is shut off by the valve element 152 when the latter takes its lower position due to the energization of the solenoid 153, while the fluid flowing through the fluid passage 151 is discharged through the discharge port 154 and then through a fluid passage 161 extending through the valve element 152. When the solenoid 153 is de-energized, the valve element 152 is urged upwardly so that fluid under line pressure $P_L$ is supplied from the fluid chamber 111 to the check valve 107 through the fluid passage 121', the orifice 158, the discharge port 154 and the fluid passage 151. A fluid chamber is defined between the valve element 152 and the valve guide 162. In this modification, however, the solenoid 153 must be energized and de-energized when the load on the engine is high and low respectively.

By virtue of the capability of obtaining the control pressure characteristic in the manner described above, a line pressure taking into consideration the engine output and the torque multiplying action of the torque converter can be supplied to the servo chambers for the clutches and brake bands so as to produce a sufficient but non-excessive engaging force in the low speed range, while a constant low line pressure can be supplied to the servo chambers to prevent power losses including losses occurring in the oil pump and other elements in the high speed range since the torque multiplying action of the torque converter is lost in the high speed range due to the fact that the torque converter acts substantially as a hydraulic coupling.

The present invention eliminates a great shock which has been encountered when the manual valve is shifted from one range to another as well as when the power is turned off or an upshift occurs in the low speed range so that an automatic shift can be smoothly carried out and the driver can enjoy a comfortable drive.

While preferred embodiments of the present invention have been described with reference to a three-forward speed and one-reverse speed automatic transmission, it will be apparent to those skilled in the art that various other changes and modifications may be made therein without departing from the scope of the appended claims.

We claim:

1. In a fluid controlled type automatic transmission for vehicles including a hydraulic torque converter or hydraulic coupling, a gear unit having brake band means and clutch means, fluid pressure operated servo means for said brake band means and said clutch means, a source of fluid pressure, a fluid pressure circuit for supplying and discharging fluid under pressure to and from said servo means, said circuit including shift valve means responsive to a predetermined running condition of the vehicle for establishing low speed and high speed forward drive ratios for said gear unit, and a pressure regulator valve for controlling the fluid pressure delivered from said source to said fluid pressure circuit, said regulator valve including a valve spool and a plurality of valve chambers, the improvement comprising control means for varying the pressure regulating action of said regulating valve in accordance with engine load, said means including a control valve in fluid connection with one of said valve chambers for controlling fluid pressure in said chamber and means responsive to engine load for opening and closing said control valve to thereby effect movement of the pressure regulator valve spool.

2. Apparatus as in claim 1 wherein said regulator valve is responsive to the operation of said control valve in a mode to deliver low and high fluid pressure to said fluid pressure circuit when engine load is low and high, respectively.

3. Apparatus as in claim 1 wherein said means responsive to engine load generates an electrical signal depending on engine load, wherein said control valve is a solenoid operated valve adapted to be closed and opened in response to the appearance and disappearance, respectively, of said electrical signal, and wherein the pressure delivered from said pressure regulator valve to said fluid pressure circuit is high when no electrical signal is applied to said solenoid valve.

4. Apparatus as in claim 1 wherein said control means for varying the pressure regulating action of said regulating valve is also responsive to operation of said shift valve means, said control means including fluid passage means extending between said shift valve means and said one valve chamber in said pressure regulator valve for changing the pressure in said valve chamber upon a preselected operation of said shift valve means.

5. In a fluid controlled type automatic transmission for vehicles including a hydraulic torque converter or hydraulic coupling, a gear unit having brake band means and clutch means, fluid pressure operated servo means for said brake band means and said clutch means, a source of fluid pressure, a fluid pressure circuit for supplying and discharging fluid under pressure to and from said servo means, said circuit including shift valve means responsive to a predetermined running condition of the vehicle for establishing low speed and high speed forward drive ratios for said gear unit, and a pressure regulator valve for controlling the fluid pressure delivered from said source to said fluid pressure circuit, said regulator valve including a valve spool and a control chamber containing fluid acting on said spool, the improvement comprising: means defining a control chamber containing fluid acting on said pressure regulator valve spool, said pressure regulator valve being constructed such that movement of said spool under increased pressure in said control chamber decreases the fluid pressure delivered to said fluid pressure circuit by said pressure regulator valve; a solenoid operated valve in fluid connection with said control chamber and having a discharge port and movable valve element for selectively closing said port and opening said port to place the same in fluid communication with said control chamber, said solenoid operated valve being closed when electrically energized and being open when de-energized; means for detecting the load on the engine and for generating an electrical signal when the load exceeds a predetermined value; and an electrical circuit for controlling said solenoid operated valve in response to the electrical signal generated by said electrical signal generating means.

6. Apparatus as in claim 5 including fluid passage means extending between said shift valve means and said control chamber in said pressure regulator valve for introducing fluid pressure from said shift valve means into said control chamber upon a preselected operation of said shift valve means and for preventing discharge of said introduced fluid pressure through said solenoid operated valve should the latter be in the open position.

* * * * *